Figure 1:
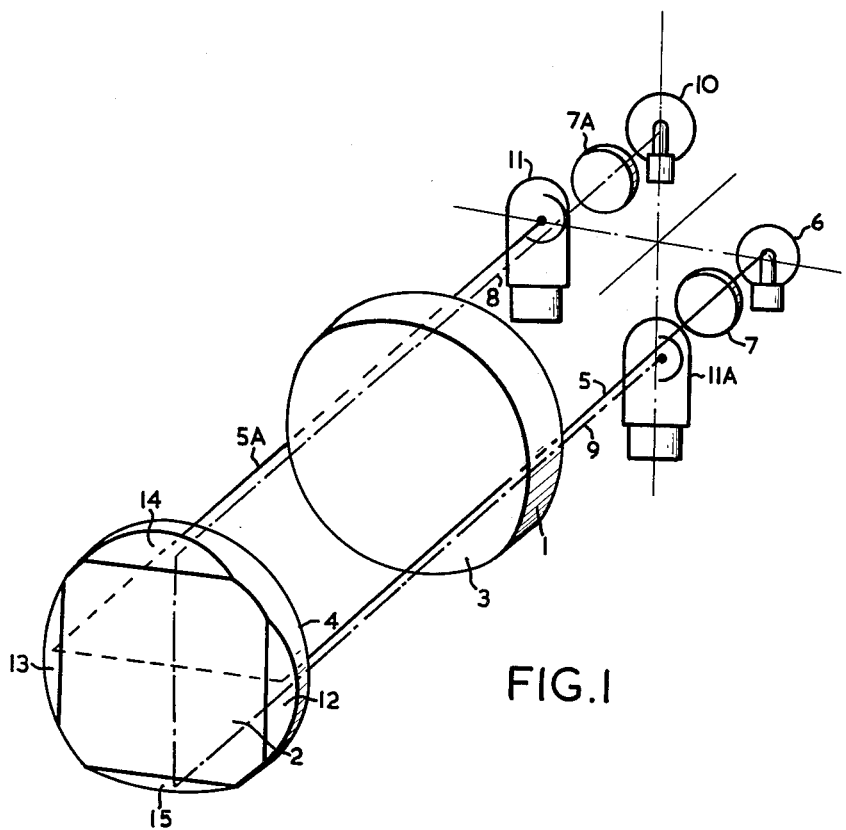

Nov. 23, 1965   J. V. RAMSAY   3,218,915
APPARATUS FOR AUTOMATICALLY MAINTAINING PARALLELISM
BETWEEN TWO OPTICALLY FLAT SURFACES
Filed June 25, 1962   3 Sheets-Sheet 1

Nov. 23, 1965   J. V. RAMSAY   3,218,915
APPARATUS FOR AUTOMATICALLY MAINTAINING PARALLELISM
BETWEEN TWO OPTICALLY FLAT SURFACES
Filed June 25, 1962   3 Sheets-Sheet 2

Jack Vincent Ramsay
Inventor
By Wenderoth, Lind & Ponack
Attorneys

United States Patent Office 3,218,915
Patented Nov. 23, 1965

3,218,915
APPARATUS FOR AUTOMATICALLY MAINTAINING PARALLELISM BETWEEN TWO OPTICALLY FLAT SURFACES
Jack V. Ramsay, Seaforth, New South Wales, Australia, assignor to Commonwealth Scientific and Industrial Research Organization, East Melbourne, Victoria, Australia, a body corporate of Australia
Filed June 25, 1962, Ser. No. 204,679
Claims priority, application Australia, July 25, 1961, 7,311/61
10 Claims. (Cl. 88—14)

This invention relates to apparatus for automatically maintaining precise parallelism or a fixed angle between two optically flat surfaces.

The precise control of the parallelism of two optically flat surfaces has many applications in the field of scientific instruments and precision machines. Hitherto, automatic control of the parallelism of two surfaces to the precision required in interferometry has not been satisfactorily achieved. The present invention enables control of the parallelism to an accuracy better than $$\frac{2 \text{ mm.}}{\text{diameter of the plates in mm.}}$$

seconds of arc. The method of control is independent of the separation of the plates and can be used to control the parallelism of two plates the separation between which is fixed or continuously variable, the latter condition arising when one plate is being continuously moved with respect to the other.

In the following description the expression "multiply reflected between two surfaces" is used. This is explained as follows. Let a beam be incident on a first surface. A portion of this beam is reflected and a portion transmitted, the amount reflected and transmitted depending upon the reflectance and absorbance of the surface. The portion which is transmitted is then incident upon a second surface where a portion is again reflected being incident on the first surface where again a portion is reflected to be incident upon the second surface and a portion is again reflected back to the first surface, this process being repeated a number of times. The number of reflections the beam undergoes depends upon the reflectance of the surface, and at each reflection a portion is transmitted giving rise to an emergent transmitted beam.

An object of this invention is to provide apparatus for maintaining parallelism between two optically flat transparent surfaces comprising means for transmitting at least one beam of light so that it is multiply reflected between the surfaces near its edges on displaced go and return paths, there being at least two return paths, and means for automatically maintaining the lengths of the multiply reflecting paths at values such that the intensities of the emergent transmitted beams from the return paths are a maximum.

Another object of this invention apparatus for maintaining parallelism between two surfaces comprises two optically flat partially transparent surfaces, means for causing a beam of light to be multiply reflected between the two surfaces at one position, and by the use of an auxiliary optical system, to cause the emergent transmitted beam to be multiply reflected again between the two surfaces at a minimum of two other positions displaced from the original position and from each other, so that the individual rays make the same angles with the normals to one surface on their forward and return passages, and means for automatically adjusting the distance along two normals suitably disposed on one or both surfaces to ensure maximum transmission of light in each of the emergent transmitted beams. In the preferred form two sets of normals are used spaced apart along diameters at right angles. However three equally spaced normals could be used by transmitting the beam in one direction along one normal, splitting the beam into two parts, and returning the two split beams along the two other normals respectively. The variation in distance along a normal may be achieved by a voltage applied to an electromechanical transducer. By securing the plates to flat surfaces at a desired angle a fixed angle of inclination between the flat surfaces, whether transparent or opaque, may be achieved.

Figure 2:
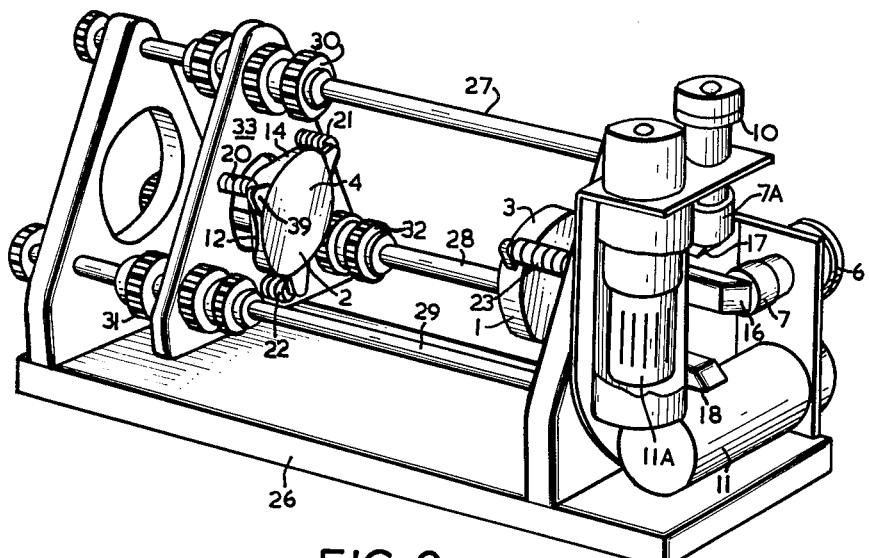
Figure 3:
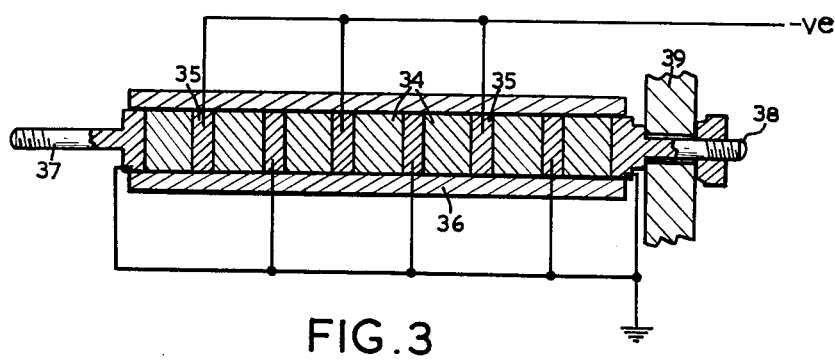
Figure 4:
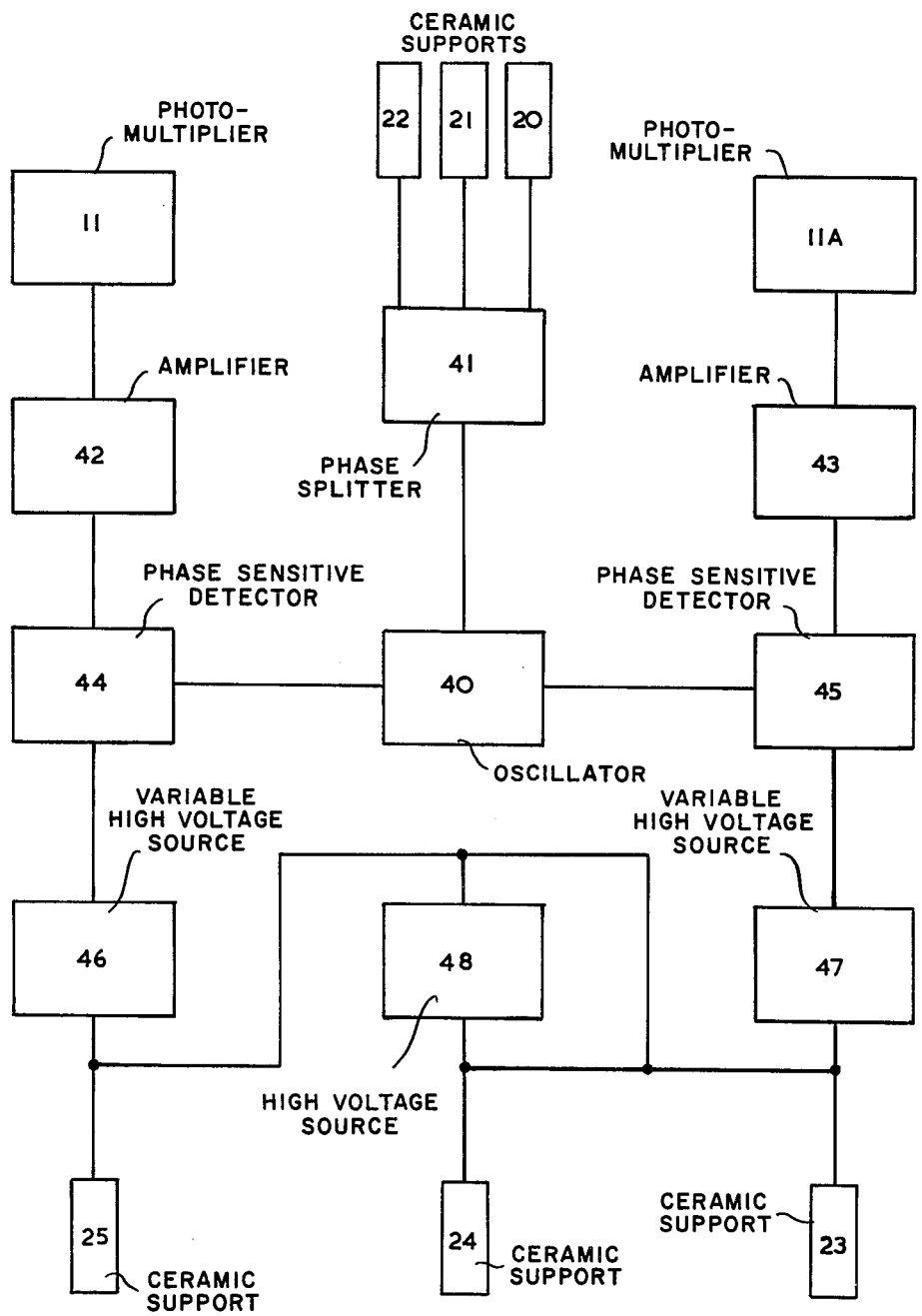

Reference will now be made to the drawings accompanying this specification in which FIGURE 1 is a diagrammatic sketch showing the invention applied to the control of parallelism of two partially transparent plates, FIGURE 2 is a perspective drawing of a Fabry-Perot interferometer embodying the system of FIGURE 1, FIGURE 3 is an enlarged section of a barium titanate piezoelectric support, and FIGURE 4 is a block diagram of a servo system used with the interferometer of FIGURE 2.

Referring first to FIGURE 1, two partially transparent plates 1, 2 (which may be interferometer plates), each having an optically flat surface 3, 4 which has been made highly reflecting with negligible absorption, are positioned so that the optically flat surfaces face each other. The surfaces are assembled so as to be approximately parallel and coaxial. A collimated beam of white light 5 approximately normal to the surfaces from a source 6 and collimating lens 7 passes through the two plates near their edges. After emergence from the second highly reflecting surface, the beam of light is caused, by an auxiliary optical system, to return as the beam 5A through the plates near the edges diametrically opposite to those which the beam traversed on its forward passage. After emergence from the surface 3 and passage through the plate 1 the beam 5A is incident on a photomultiplier 11. The auxiliary optical system which causes the light to return through the two plates must be such that the inclination of any one ray to the normal must be effectively the same for the forward and return passages between the plates. On its forward passage the light suffers multiple reflections between the two highly reflecting surfaces and, as a result, the emergent transmitted beam from the second surface 4 is in the form of channel spectra; that is, some wavelengths are transmitted freely and others are largely suppressed, the wavelengths transmitted depending on the optical separation of the surfaces. A similar phenomenon occurs on the return passage so that the emergent transmitted beam from the surface 3 is also in the form of channel spectra. As a consequence a maximum transmission occurs when the optical separations at the opposite edges of the plates are identical. A similar system operating about a diameter normal to the first ensures parallelism of the two plates and comprises the beams 8, 9, light source 10, and photomultiplier 11A.

There are numerous ways of making the light return through an area opposite to where it entered and making the same angle with the normal to any one plate. In the particular scheme shown in FIGURE 1, this is effected by two prisms formed on the rear of the plate 2 in which 12 and 13 are the faces of one prism and 14, 15 the faces of the second prism.

To effect automatic control of parallelism one plate is mounted on a rigid base by three bearing supports, the length of each of which can be varied by an electrical signal. In the preferred form of the invention the bearing supports include columns of piezoelectric barium titanate ceramic whose length is varied by the application of an electrical voltage.

FIGURE 2 shows a Fabry-Perot interferometer incoporating the system of FIGURE 1, and similar reference numerals have been used in the two figures. 1 and 2 are the interferometer plates. The interferometer plate 2 is attached to a base plate 33 by means of lugs such as 39 secured to three columns of piezoelectric ceramics 20, 21 and 22. The plate 1 is similarly attached to a base 26 by means of lugs secured to three piezoelectric supports 23, 24, 25 of which one only, 23, is visible in the drawing. The base plate 33 is carried by three rods 27, 28 and 29 and may be positioned anywhere along these rods by means of nuts 30, 31 and 32. This enables a gross change in separation of the plates to be made, fine movement being obtained from the piezoelectric supports. Nuts 30, 31 and 32 also enable the plates to be made approximately parallel so that the necessary corrections for precise parallelism are within the range of movement of the piezoelectric ceramic supports. The beam of light for the parallelism control about a vertical axis is obtained from the light source 6, collimated by lens 7 and then directed by the prism 16, FIGURE 2, along a path through the plates 1 and 2 at a position near their edge. The light is caused to return through the plates at a position near the opposite edge of the diameter by means of prisms 12 and 13 on the back surface of plate 2 after which it is led into the photomultiplier 11 by means of another prism (not shown). The necessary electrical connections are not shown in FIGURE 2 but these are obvious. An identical system consisting of source 10, colimating lens 7A, prism 17, prismatic surfaces 14, 15, prism 18 and photomultipler 11A is used for control about the horizontal axis. The surface 4 is oscillated about its centre by means of an oscillatory voltage applied to the ceramic supports 20, 21 and 22. The construction of one of the barium titanate ceramic supports is shown in FIGURE 3. The ceramics 34 are laminated together by means of a conducting adhesive. The whole assembly after the necessary electrical connections have been made is encapsulated in an insulating resin 36. The threaded electrode 37 is secured to the member 33 and the threaded electrode 38 is secured to the movable member, e.g. the lug 39 on plate 2. The assembly is then prepolarised by applying an electrical field of 1000 V./mm. of the same polarity as is to be used in the instrument, heating to 140° C. and allowing it to cool with the electrical field applied, after which the assemblies are ready for use.

There are two methods of using the phenomenon of maximum transmission to ensure parallelism of the two plates. One is to measure the total amount of light transmitted and picked up by each of the photomultipliers and to control the system so that this remains constant at its maximum value. However the preferred method is a null method using very small oscillations about the desired position. This method is largely independent of fluctuations in source brightness. The amount of movement required is approximately $\pm 5 \times 10^{-7}$ cm. ($\lambda 100$ of green light); this has no significant effect on the performance of the instrument, as the residual errors in flatness of the surfaces themselves are generally greater than this.

Referring now to FIGURE 4, an oscillatory voltage from an oscillator 40 is applied to the barium titanate ceramic supports 20, 21, 22 by way of a phase splitter 41 whereby plate 2 is oscillated about its centre so as to give the required components of tilt about the two axes at right angles to each other. The output from the photomultipliers 11, 11A then includes an oscillatory component. When the oscillation is symmetrical about the position giving maximum response the signal contains no component of the driving frequency. Any error in the mean position about which the plate oscillates produces an output at the driving frequency, and the phase angle between this output and the driving voltage indicates the direction of the error. After amplification in amplifiers 42, 43 the output from the photomultipliers is applied to the phase sensitive detectors 44, 45. The outputs from the phase sensitive detectors are used to apply D.C. voltages to the barium titanate ceramics, thus correcting the error. As shown the output from detector 44 is used to control the D.C. coltage from a variable high voltage source 46 which is applied to the barium titanate suport 25, while the output from detector 45 similarly controls a variable high voltage source 47 whose output is applied to support 23. Support 24 is supplied from a constant sum high voltage source 48. This arrangement forms a servo-control system which adjusts the position of the plate to give a null amplitude at the fundamental driving frequency in each of the two multiplier outputs, thus achieving parallelism of the plates. The method of control as described is independent of the plate separation, and can be used for the case when the plates are stationary or moving relative to each other. All the functions performed in the servo-control loop are standard functions.

The method of operation of the instrument is as follows. The plate separation is adjusted to the required value and the surfaces made approximately parallel by means of nuts 30, 31 and 32. The voltage applied to the ceramics is then altered manually until a maximum output as indicated by a meter is obtained from each multiplier after which, by means of a switch, the servo-control system is locked on, the surfaces 3 and 4 then automatically remaining parallel.

An alternative mounting when a continuously variable separation of the plates, which are to be maintained parallel, is desired is made as follows. The support 33 carrying the plate 2 as shown in FIGURE 2 is mounted on a saddle which may be driven along two guide rails by a mechanical lead screw. The alignment of the guide rails must be such that any departure from parallelism by moving the saddle along the guide rails is within range of correction of the electromechanical transducers 23, 24 and 25. The plates 1 and 2 are then made approximately parallel by means of adjusting nuts on the saddle. Precise parallelism is then achieved by manual operation of the controls, and the automatic parallelism control switched on, as described above, after which the plate 2 may be traversed along the guide rails, the servo-control system maintaining precise parallelism of the plates during this movement.

The invention can be used to maintain parallelism or a fixed inclination of any two flat surfaces. In the case of opaque plates or at inclinations other than zero, the optically flat control plates would have to be fixed rigidly to the plates whose surfaces are to be maintained at the given angle. An alternative method for maintaining the control plates at a fixed inclination other than zero is the insertion of a transparent wedge achromatic prism of suitable angle between the plates so that the plates, whilst maintained optically parallel, are physically inclined at the required angle. In this case a monochromatic source is necessary, because of dispersion in the transparent wedge; or the wedge would need to be especially designed to be non-dispersing.

One of the more important applications of the invention is in the automatic control of the parallelism of Fabry-Perot and Michelson interferometers. With such control the Fabry-Perot and Michelson interferometers become instruments suitable for the applications listed below.

(1) As a filter to narrow the bandwidth of spectral lines so that optical interference is possible over longer distances. Such interference can be used for length determination and for surface contour determination, and generally provides an extension of the range of present interferometric techniques.

(2) As a turntable narrow band monochromatic filter. It acts in the same way as an ordinary interference filter, the pass bandwidths and positions of maximum transmission of which are capable of a wide range of variation.

(3) Control of precision machine tools and measuring machines directly in terms of the wavelength of light.

(4) Use in Fourier methods of spectroscopy.

(5) As a high resolution high speed scanning spectograph.

(6) Use for the investigation of the physics of non-coherent scattering processes, in which a change may occur in the wave-length of the scattered light.

(7) Use in the manufacture of an optical maser in which strict control of parallelism of the necessary Fabry-Perot interferometer is required.

(8) Use in frequency modulated communication using optical frequencies whereby one Fabry-Perot interferometer is used as a transmitter and an identical one as a receiver.

(9) Use in the measurement of high temperatures by means of the Doppler broadening of spectral lines.

What I claim is:

1. Apparatus for maintaining parallelism between two partially transparent optically flat surfaces comprising means for causing a beam of light to be multiply reflected between the two surfaces at one position and to finally pass through and emerge from one of the surfaces to form a first emergent transmitted beam, an auxiliary optical system which causes the said first emergent beam to be multiply reflected again between the two surfaces at a minimum of two other positions displaced from the said one position and from each other and to finally pass through and emerge from the other surface to form further emergent transmitted beams, so that the said first and further emergent transmitted beams make the same angle with the normals to one surface on their forward and return passages, and means for automatically adjusting the distance along the normals at the said positions to ensure maximum transmission of light in each of the transmitted emergent beams.

2. Apparatus for maintaining parallelism between two optically flat partially transparent surfaces comprising means for causing a first beam of light to be multiply reflected between the two surfaces along a first normal to the surfaces and to finally pass through and emerge from one of the surfaces to form a first emergent transmitted beam, a first auxiliary optical system which causes the said first emergent beam to be mutiply reflected again between the two surfaces along a second normal to the surfaces, the beam after the last-mentioned reflections passing through and emerging from the other of said surfaces to form a second emergent transmitted beam, means for causing a second beam of light to be multiply reflected between the two surfaces along a third normal to the surfaces and to finally pass through and emerge from one of said surfaces to form a third emergent transmitted beam, a second auxiliary optical system which causes the said third emergent beam to be multiply reflected between the two surfaces along a fourth normal to the surfaces, the beam after the last-mentioned reflections passing through and emerging from the other of said surfaces to form a fourth emergent transmitted beam, and means for automatically adjusting the distances along the said normals to ensure maximum transmission of light in the beams emerging after the reflections along the said second and fourth normals.

3. Apparatus as claimed in claim 2 wherein both surfaces are supported by pillars of pieozoelectric material, means for oscillating one surface about its centre by oscillatory potentials applied to its supporting pillars, and a servo-control loop by which the output at the frequency of the said oscillatory potential in the emergent beams is used to control potentials applied to the piezoelectric pillars of the other surface.

4. Apparatus for maintaining parallelism between the facing optically flat surfaces of two partially transparent plates, including means for causing a first light beam to be multiply reflected between the facing surfaces at first points adjacent the edges of the plates and to finally pass through and emerge from one of said plates to form a first emergent transmitted beam, a first auxiliary optical system which causes the said first emergent beam to be multiply reflected between the facing surfaces at second points adjacent the edges of the plates and opposite to the first points, the beam after said last-mentioned multiple reflections passing through and emerging from the other of said plates to form a second emergent transmitted light beam, means for causing a second light beam to be multiply reflected between the facing surfaces at third points adjacent the edges of the plates and to finally pass through and emerge from one of said plates to form a third emergent transmitted beam, a second auxiliary optical system which causes the said third emergent beam to be multiply reflected between the facing surfaces at fourth points adjacent the edges of the plates, said last-mentioned beam after said last-mentioned multiple reflections passing through and emerging from the other of said plates to form a fourth emergent transmitted beam, and opposite to the third points, and means for automatically varying the lengths of the multiply reflecting paths so as to maintain the intensity of the emergent beams of light at a maximum.

5. Apparatus as claimed in claim 1 wherein the said automatic adjusting means includes means for oscillating one optically flat surface about its centre through a small angle at a driving frequency, means for measuring the amplitude and phase of the component of driving frequency of the modulated intensities of the emergent light beams, and means for controlling the lengths of the multiply reflecting paths in accordance with the measured components of driving frequency.

6. A Fabry-Perot interferometer comprising a first circular partially transparent plate, a second circular partially transparent plate spaced from the first plate on a common axis, optically flat facing surfaces on the two plates which are approximately parallel, means for projecting a first beam of light through the first partially transparent plate near a point on its circumference substantially normal to the said optically flat surfaces, so that the light beam is multiply reflected between the said optically flat surfaces, means for transferring the emergent beam after said multiple reflections across the second partially transparent plate to a diametrically opposite point comprising a first prismatic reflecting surface at the circumference of the rear face of the second plate, means for projecting the reflected beam substantially normal to the said optically flat surfaces so that the light beam is multiply reflected between them comprising a second prismatic reflecting surface at the circumference of the rear face of the second plate at a point diametrically opposite the said first prismatic surface, means for projecting a second beam of light through the first partially transparent plate and substantially normal to the optically flat surfaces at a point near the circumference of the plate at right angles to points at which the said first beam enters and emerges from the plate, means for transferring the emergent beam after multiple reflections between the optically flat surfaces across the second partially transparent plate to a diametrically opposite point comprising a third prismatic reflecting surface at the circumference of the rear face of the second plate, means for projecting the reflected beam substantially normal to the said optically flat surfaces comprising a fourth prismatic reflecting surface at the circumference of the rear face of the second plate at a point diametrically opposite the said third prismatic surface, means for collecting the two multiply reflected beams emerging from the said first transparent plate, and converting the intensities of the beams into electric signals, means for oscillating one of the partially transparent plates about its centre through a small amplitude, and a servo-mechanism which controls the position of the other transparent plate in accordance with the amplitudes of the component of driving frequency in the said electric signals so as to maintain the said amplitudes at a minimum.

7. A Fabry-Perot interferometer comprising a first transparent plate, piezoelectric pillers supporting the plate, a second transparent plate spaced from the first on a common axis, piezoelectric pillars supporting the second plate in substantial parallelism with the first plate, optically flat facing surfaces on the two plates, means for applying an oscillating electrical voltage to the piezoelectric pillars of one plate to cause the plate to oscillate about its centre through a small amplitude, means for causing at least one beam of light to be multiply reflected between the surfaces near their edges at one position and to pass through and emerge from one of the surfaces to form an emergent transmitted beam, an auxiliary optical system for causing the emergent beam to be multiply reflected again between the surfaces near their edges at a minimum of two other positions displaced from said one position and each other, the beam after the last-mentioned multiple reflections passing through and emerging from the said other plate to form further emergent transmitted beams, means for deriving from the said further emergent light beams from the return paths electric potentials dependent upon the amplitude in the said further emergent beams of the frequency at which the said one plate is oscillated, and means for applying the said potentials to the piezoelectric pillars of the other plate in such fashion as to maintain the said amplitudes in the said further emergent beams at a minimum.

8. The combination as claimed in claim 7 in which each piezoelectric pillar comprises a plurality of sections of barium titanate rod cemented together in axial alignment by a conductive cement.

9. A Fabry-Perot interferometer comprising two spaced partially transparent plates having facing optically flat surfaces, means for causing a beam of light to be multiply reflected between the said facing optically flat surfaces along a first normal to the surfaces near the edge of the plates and finally passes through and emerges from the optically flat surface of the second transparent plate, a first auxiliary optical system which transfers the emergent beam to a diametrically opposite point on the said second transparent plate and causes it to be multiply reflected between the said facing optically flat surfaces along a second normal to the surfaces and finally passes through and emerges from the first partially transparent plate, means for causing a second beam of light to be multiply reflected between the said facing optically flat surfaces along a third normal to the surfaces at points about halfway between the incident and emergent points for the first beam and finally pass through and emerge from the optically flat surface of the second transparent plate, a second auxiliary optical system which transfers the emergent beam to a diametrically opposite point on the said second transparent plate and causes it to be multiply reflected between the said facing optically flat surfaces along a fourth normal to the surfaces and emerges from the first transparent plate, means for oscillating one of the plates about its centre, means for collecting the two multiply reflected beams emerging from the first transparent plate and a servo-mechanism controlling the position of the other plate so as to hold the component of frequency at which the said one plate is oscillated in the two beams emerging from the said first plate at a minimum.

10. A Fabry-Perot interferometer comprising a first circular partially transparent plate, a second circular partially transparent plate spaced from the first plate on a common axis, optically flat facing surfaces on the two plates which are approximately parallel, means for projecting a first beam of light through the first partially transparent plate substantially normal to the said optically flat surfaces near a point on the circumference of the first plate, so that the light beam is multiply reflected between the said optically flat surfaces and finally passes through and emerges from the second partially transparent plate, means for transferring the emergent beam after said multiple reflections across the second plate to a diametrically opposite point comprising a first prismatic reflecting surface at the circumference of the rear face of the second plate, means for projecting the reflected beam substantially normal to the said optically flat surfaces so that the light beam is multiply reflected between them and finally passes through and emerges from the first partially transparent plate comprising a second prismatic reflecting surface at the circumference of the rear face of the second plate at a point diametrically opposite the said first prismatic surface, means for projecting a second beam of light through the first plate and substantially normal to the optically flat surfaces at a point near the circumference of the plate at right angles to points at which the said first beam enters and emerges from the plate so that the second beam is multiply reflected between the said optically flat surfaces and finally passes through and emerges from the second plate, means for transferring the last-mentioned emergent beam across the second plate to a diametrically opposite point comprising a third prismatic reflecting surface at the circumference of the rear face of the second plate, means for projecting the reflected beam substantially normal to the said optically flat surfaces so that the beam is multiply reflected between them and finally passes through and emerges from the first plate comprising a fourth prismatic reflecting surface at the circumference of the rear face of the second plate at a point diametrically opposite the said third prismatic surface, means for collecting the two multiply reflected beams emerging from the said first plate, and means for automatically varying the lengths of the multiply reflecting paths so as to maintain the intensity of the emergent beams of light at a maximum.

References Cited by the Examiner

Cook et al.: "An Automatic Fringe Counting Interferometer For Use in the Calibration of Line Scales," Journal of Research of the N.B.S., vol. 65C, No. 2 April-June 1961, pages 129 to 140.

Bennett, Jr.: "Hole Burning Effects in a He-Ne Optical Maser," Physical Review, vol. 126, No. 2, April 15, 1962, pages 580 to 593.

Tolansky et al.: "An Oscillating Fabry-Perot Interferometer," Interferometry-National Physical Laboratory Symposium No. 11, paper 3–1, pages 375 to 386 published Dec. 14, 1960.

JEWELL H. PEDERSEN, *Primary Examiner.*